(12) United States Patent
Wilkie et al.

(10) Patent No.: US 12,539,694 B2
(45) Date of Patent: Feb. 3, 2026

(54) FLOATABLE OPAQUE UNIAXIAL SHRINK FILM CONTAINING POLYOLEFIN AND SILICA GEL VOIDING AGENT

(71) Applicant: TAGHLEEF INDUSTRIES INC., Newark, DE (US)

(72) Inventors: Andrew Wilkie, Avondale, PA (US); Anthony Denicola, Old Lyme, CT (US); Eric Propst, Terre Haute, IN (US)

(73) Assignee: TAGHLEEF INDUSTRIES INC., Newark, DE (US)

( * ) Notice: Subject to any disclaimer, the term of this patent is extended or adjusted under 35 U.S.C. 154(b) by 116 days.

(21) Appl. No.: 18/630,720

(22) Filed: Apr. 9, 2024

(65) Prior Publication Data

US 2025/0313001 A1    Oct. 9, 2025

(51) Int. Cl.
| | |
|---|---|
| *B32B 27/20* | (2006.01) |
| *B32B 7/035* | (2019.01) |
| *B32B 27/08* | (2006.01) |
| *B32B 27/32* | (2006.01) |
| *B32B 38/00* | (2006.01) |

(52) U.S. Cl.
CPC ............ *B32B 27/205* (2013.01); *B32B 7/035* (2019.01); *B32B 27/08* (2013.01); *B32B 27/32* (2013.01); *B32B 38/145* (2013.01); *B32B 2250/242* (2013.01); *B32B 2255/26* (2013.01); *B32B 2264/1021* (2020.08); *B32B 2264/1022* (2020.08); *B32B 2307/7166* (2013.01); *B32B 2307/72* (2013.01); *B32B 2307/736* (2013.01); *B32B 2323/00* (2013.01); *B32B 2439/70* (2013.01); *B32B 2439/80* (2013.01); *B32B 2519/00* (2013.01)

(58) Field of Classification Search
None
See application file for complete search history.

(56) References Cited

U.S. PATENT DOCUMENTS

| | | | |
|---|---|---|---|
| 4,741,950 | A | 5/1988 | Liu et al. |
| 5,397,635 | A | 3/1995 | Wood |

(Continued)

FOREIGN PATENT DOCUMENTS

| | | |
|---|---|---|
| CA | 3122704 A1 | 6/2020 |
| WO | 9414606 A1 | 7/1994 |

(Continued)

OTHER PUBLICATIONS

International Search Report from corresponding PCT/US2025/015780 mailed May 30, 2025.

*Primary Examiner* — Elizabeth Collister
(74) *Attorney, Agent, or Firm* — CAESAR RIVISE, PC

(57) ABSTRACT

Disclosed is multilayer film having a plurality of layers including a thickest layer containing 1 to 25 wt. % of a silica gel having an average particle size of 1 to 10 microns, and at least 50 wt. % of at least one polyolefin, wherein: (a) the thickest layer is voided by the silica gel; (b) the multilayer film is a uniaxially oriented film having an opacity greater than 10, and a density of less than 1 g/cc; and (c) the multilayer film has a shrinkage of at least 20% in a machine direction or a transverse direction of formation when heated to a temperature of 80° C.-100° C. A label and a flexible package composed of the film are also disclosed.

20 Claims, 1 Drawing Sheet

(56) References Cited

U.S. PATENT DOCUMENTS

| | | | |
|---|---|---|---|
| 5,691,043 | A | 11/1997 | Keller et al. |
| 5,858,552 | A | 1/1999 | Bader et al. |
| 5,888,640 | A | 3/1999 | Marotta et al. |
| 5,972,496 | A | 10/1999 | Bader et al. |
| 6,242,084 | B1 | 6/2001 | Peet |
| 6,455,150 | B1 | 9/2002 | Sheppard et al. |
| 6,572,960 | B2 | 6/2003 | Amon |
| 7,015,270 | B2 | 3/2006 | Scharfe et al. |
| 8,202,941 | B2 | 6/2012 | Keung et al. |
| 11,590,744 | B2 | 2/2023 | Wilkie et al. |
| 11,738,544 | B2 | 8/2023 | Denicola et al. |
| 11,752,739 | B2 | 9/2023 | Propst et al. |
| 2002/0187361 | A1* | 12/2002 | Amon .................. B32B 27/32 428/318.6 |
| 2003/0054165 | A1 | 3/2003 | Yamanaka et al. |
| 2003/0211298 | A1 | 11/2003 | Migliorini et al. |
| 2013/0115398 | A1 | 5/2013 | Lu et al. |
| 2022/0402246 | A1 | 12/2022 | Denicola et al. |

FOREIGN PATENT DOCUMENTS

| | | | |
|---|---|---|---|
| WO | 9849003 | A1 | 11/1998 |
| WO | 02090104 | A1 | 11/2002 |
| WO | 2007021366 | A1 | 2/2007 |
| WO | 2020131709 | A2 | 6/2020 |

\* cited by examiner

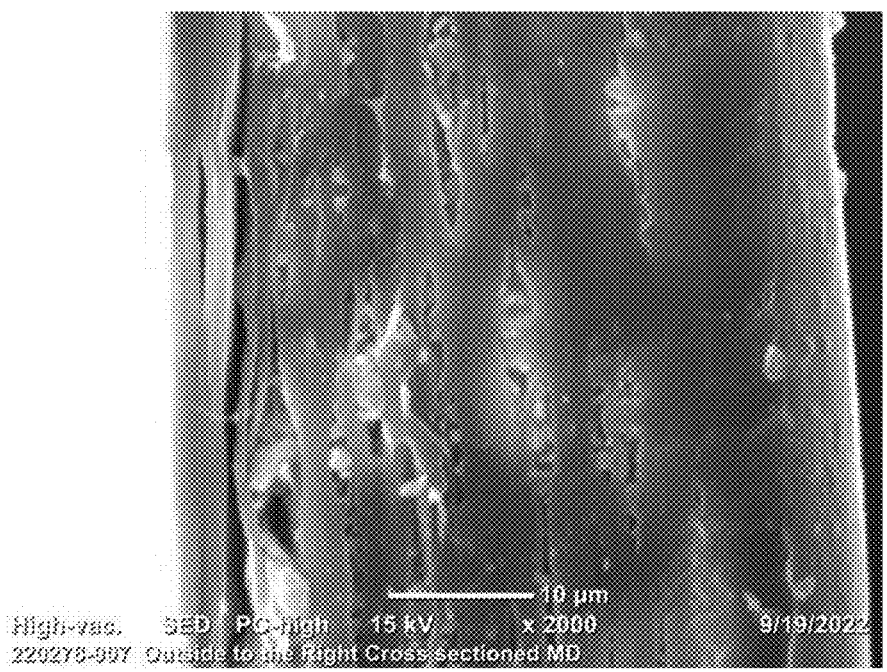

FLOATABLE OPAQUE UNIAXIAL SHRINK FILM CONTAINING POLYOLEFIN AND SILICA GEL VOIDING AGENT

BACKGROUND OF THE INVENTION

1. Field of Invention

This invention relates to shrink films suitable for use in packaging, and particularly to multilayer films containing voiding agents.

2. Description of Related Art

Shrink films can be used in labeling and packaging applications where the shrink characteristic is used to secure the label to a bottle by shrinking and conforming to the shape of the container, such as in shrink sleeve applications or the roll on shrink on (ROSO) process. Alternatively, the shrink characteristic can be used to enhance the ease of removal in wash off labels, where the act of shrinking allows better access to adhesives by the washing fluid.

Wrap around unidirectional shrink films are commonly printed and used to label packaged products in bottles and rigid containers. There is a desire for this label material after printing to float in water to enable easy separation during container recycling where the container material sinks, and the label is floated away in water.

There is also a desire for a white label that offer protection to products contained in the packages from light in both the UV (200-400 nm) and visible light (400-800 nm) ranges. Dairy products are particularly sensitive to UV radiation. While there are UV adsorbers for plastic films, they are difficult to use in conjunction with food products, and they are generally ineffective owing to the thin nature of the film. White pigments such as $TiO_2$ are very effective in the UV range, but less effective in the visible range. Additionally, $TiO_2$ can be effective for blocking direct light transmission, however, it is less helpful for scattered light which is also required to protect light sensitive food products.

Additives such as titanium dioxide and calcium carbonate are commonly used as opacifying agents and whiteners. These additives offer some deflection of UV rays. However, these additives are dense, and the need for the label material to float in water during recycling limits the amount of titanium dioxide, calcium carbonate and other high density additives that can be used.

Voiding agents are commonly used in the core layer of polypropylene films where the polymer is a homopolymer of polypropylene and typically contains no elastomer, polybutene, or copolymer. The voiding agents work by causing a fracturing of the incompatible polymer around the particle when the film is stretched. The resulting formation of an air void contributes to whiteness and opacity. See, e.g., U.S. Pat. No. 8,202,941 B2, which discloses a polypropylene based shrink film containing particles of, e.g., polybutylene terephthalate, nylon-6, calcium carbonate and cyclic olefin copolymers as voiding agents.

However, voiding agents are not as useful in uniaxial shrink films where the core is not homopolymer polypropylene, and instead is composed of polyolefin elastomers, polybutene, or copolymers with ethylene or propylene and polypropylene copolymer with ethylene or terpolymer with ethylene and butene. It is well-known that titanium dioxide, alumina, calcium carbonate, and silica do not void well in such low modulus materials. Consequently, large amounts of these dense additives are needed to achieve whiteness and opacity to block UV light, rendering the film too dense to float.

A useful approach to block visible and UV rays is to use a black ink containing carbon, or gray inks containing silver. Many carbon forms are particularly good at adsorbing light including visible and UV rays. However, in many applications the packaging must be white to enable printing of product information. Generally, a white opaque shrink film produced with typical voiding and opacifying agents like $TiO_2$ and $CaCO_3$ will not adequately hide the black ink on the back side and suffer an unacceptable reduction in whiteness required for package labeling.

Patents and published patent applications relevant to the foregoing discussion include U.S. Pat. No. 5,888,640, US20030211298 A1, US20220402246 A1, U.S. Pat. No. 11,590,744 B2, US 20030054165 A1, U.S. Pat. No. 5,691,043 and US20130115398 A1.

Although silica broadly has been taught as a voiding agent in films, silica gels are not known to be useful for said purpose.

Silica gels are used in films for purposes other than voiding. For example, it is known to use silica gels as anti-blocking agents and/or anti-slip agents. See, e.g., U.S. Pat. Nos. 4,741,950, 5,397,635, 5,972,496, 6,242,084 B1, 6,455,150 B1, 6,572,960 B2, WO 9849003 A1, WO 02090104 A1, WO 9414606 A1 and EP 1919705 A1.

U.S. Pat. No. 7,015,270 discloses a water-based coating formulation patent in which silica gel is used as a pigment.

WO 20200131709 A2 discloses extruded multilayer films comprising an extruded top layer comprising a blend of one or more polyolefins and 5 wt. % adsorbent silica, which is preferably a silica gel. Adsorbent silicas, such as silica gel, are taught to provide improved printability. They are not taught to be voiding agents.

Thus, there is no suggestion in the prior art to use silica gel as a voiding agent. Indeed, U.S. Pat. No. 5,397,635 teaches silica gel can function as an anti-blocking agent in the skin without imparting objectionable haze to the structure, which suggests that silica gel would not function as a voiding agent.

Accordingly, it is desired to provide voiding agents that address the deficiencies of prior art voiding agents and opacifying agents in uniaxial stretch films. It is further desired to provide voided uniaxial films prepared from improved voiding agents. It is still further desired to provide said voided uniaxial films that are white, opaque, less dense and preferably more durable than prior art films.

All references cited herein are incorporated herein by reference in their entireties.

BRIEF SUMMARY OF THE INVENTION

Accordingly, a first aspect of the invention is a multilayer film comprising a plurality of layers including a thickest layer comprising 1 to 25 wt. % of a silica gel having an average particle size of 1 to 10 microns, and at least 50 wt. % of at least one polyolefin, wherein: (a) the thickest layer is voided by the silica gel; (b) the multilayer film is a uniaxially oriented film having an opacity greater than 10, and a density of less than 1 g/cc; and (c) the multilayer film has a shrinkage of at least 20% in a machine direction or a transverse direction of formation when heated to a temperature of 80° C.-100° C.

In certain embodiments, the at least one polyolefin is at least one member selected from the group consisting of polypropylene, polyethylene, polypropylene/polyethylene copolymer, polypropylene/polyethylene/polybutylene terpolymer, butene-1 copolymer with ethylene and styrenic triblock (S-E/B-S) copolymer elastomers.

In certain embodiments, the at least one polyolefin comprises polypropylene and copolymers thereof.

In certain embodiments, the polyolefin comprises propylene-ethylene-butene terpolymer, polybutene-1 copolymer with ethylene, polyolefin elastomer, and polypropylene ethylene copolymer.

In certain embodiments, the thickest layer comprises 5-10 wt. % of the silica gel, 20-30 wt. % propylene-ethylene-butene terpolymer, 15-20 wt. % polybutene-1 copolymer with ethylene, 18-25 wt. % polyolefin elastomer, and 20-25 wt. % polypropylene-ethylene copolymer.

In certain embodiments, a whiteness of a print receiving surface of the multilayer film after application of a black ink to an opposing surface of the film is at least 50% of the whiteness of the print receiving surface before the application of the black ink to the opposing surface.

In certain embodiments, the density is less than 0.95 g/cc, the opacity is greater than 50 and the whiteness is greater than 60.

In certain embodiments, the z-axis strength is greater than 100 g/in.

In certain embodiments, the multilayer film has a z-axis strength greater than 400 g/in, and a stiffness greater than 4 g/in.

In certain embodiments, the silica gel adsorbs less than 8% moisture at 80% relative humidity.

In certain embodiments, the multilayer film further comprises titanium dioxide.

In certain embodiments, the multilayer film comprises a combination of voiding agents including at least one additional voiding agent in addition to the silica gel, wherein an average density of the combination of voiding agents in the multilayer film is less than 1 g/cc.

In certain embodiments, a surface of the multilayer film is treated or coated.

A second aspect of the invention is a label comprising the multilayer film of the invention.

In certain embodiments, the label is a wash off label

In certain embodiments, the label is a roll on shrink on (ROSO) label.

A third aspect of the invention is a flexible package comprising the multilayer film of the invention.

In certain embodiments, the flexible package further comprises black ink on a surface opposing a print receiving surface, wherein an opacity of the flexible package is greater than 50 and a whiteness of the print receiving surface is greater than 60.

In certain embodiments, the flexible package has a density of the flexible package is less than 0.95 g/cc.

In certain embodiments, the flexible package further comprises ink on the print receiving surface, wherein a density of the flexible package is less than 1 g/cc.

BRIEF DESCRIPTION OF SEVERAL VIEWS OF THE DRAWING

The invention will be described in conjunction with the following drawing, wherein:

FIG. 1 is a scanning electron microscopic image of a cross-sectioned core of the film of Example 2 at 2000× magnification.

DETAILED DESCRIPTION OF PREFERRED EMBODIMENTS OF THE INVENTION

Glossary

Throughout the description, where the invention is specified as "having", "including" or "comprising" (or other conjugations thereof) a feature, it should be understood that these are open terms such that the invention may include additional features. In addition, where an embodiment of the invention is specified as having, including or comprising a feature, the invention also encompasses alternative embodiments wherein additional features are strictly excluded (as indicated by the use of the transitional phase "consisting of") and alternative embodiments wherein additional features are excluded only if they will have a material effect on the invention (as indicated by the use of the transitional phrase "consisting essentially of").

Where an element or component is said to be included in and/or selected from a list of recited elements or components, it should be understood that the element or component can be any one of the recited elements or components and can alternatively be selected from the group consisting of any combination of two or more of the recited elements or components.

The use of the singular herein includes the plural (and vice versa) unless specifically stated otherwise. Thus, the terms "a" and "an" mean "at least one" unless stated otherwise.

The term "substantially free of" refers to an inconsequential amount of a stated ingredient or thing. "Free of" refers to no detectable amount of the stated ingredient or thing.

The dimensions and values disclosed herein are not to be understood as being strictly limited to the exact numerical values recited. Instead, unless otherwise specified, each such dimension is intended to mean both the recited value and functionally equivalent range surrounding that value. For example, a volume of "40 ml" is intended to mean "about 40 ml". Where the term "about" is used before a quantitative value, the present teachings also include the specific quantitative value itself, unless specifically stated otherwise.

It should be understood that the order of steps or order for performing certain actions is immaterial so long as the present teachings remain operable. Moreover, two or more steps or actions can be conducted simultaneously.

Unless specified otherwise the following terms shall have the specified meanings set forth below:

"Ambient" refers to surrounding conditions at about one atmosphere of pressure, about 50% relative humidity and about 25° C. Ambient conditions should be understood to apply unless otherwise specified.

"Olefin polymer" means a homopolymer, copolymer or terpolymer in which all of the monomer units in such polymers are olefins.

"Propylene polymer" means a propylene homopolymer, or a copolymer or a terpolymer in which the predominant monomer component by weight is propylene.

"Propylene terpolymer" or "polypropylene terpolymer" means a propylene, ethylene, butene terpolymer in which propylene is the predominant monomer unit by weight.

"Propylene ethylene copolymer" or "polypropylene ethylene copolymer" and "propylene butene-1 copolymer" or "polypropylene butene-1 copolymer" means propylene ethylene or propylene butene-1 copolymer in which propylene is the predominant monomer unit by weight.

"Polypropylene homopolymer"-includes, in addition to a homopolymer, a polypropylene ethylene copolymer in which the percentage of ethylene is so little that it does not adversely affect the crystallinity or other properties of the propylene homopolymer. These copolymers are referred to as "mini random" copolymers and have a percentage of ethylene, by weight of the copolymer, of 1% or less.

"Butene copolymer" as used herein refers to a copolymer in which butene-1 is the predominant monomer with ethylene or propylene.

"Polyolefin elastomer" as used herein refers to hard segments of crystalline polypropylene with amorphous ethylene propylene copolymer segments, such as Vistamaxx (Exxon Mobile)

"Percent shrinkage" in referring to the shrinkage of a film or a label formed from such film is calculated in accordance with the following formula:

$$\frac{(\text{Dimension prior to shrinkage} - \text{Dimension after shrinkage}) \times 100}{\text{Dimension prior to shrinkage}}$$

"Density" of the film or label formed therefrom is determined by the displacement procedure of ASTM D792 test method.

"Stiffness", "Flexural Stiffness" or "Flex Stiffness" measures the stiffness or bending resistance of plastic films using an MTS/Sintech Q-Test Model QT-5 or similar instrument, a 2N (200 g) load cell, a triangular shaped stirrup attached to the load cell and a film holding fixture with a 1 inch wide channel which holds the film in the form of an arc. Film sample length is 4 inches with width between 1 and 4 inches. Crosshead speed is 12 inches/min with maximum compressive force required to bend the film sample at the center of the arc being measured. Results are reported as grams per inch width (peak grams divided by sample width in inches).

"Opacity" of a film or label formed therefrom is determined in accordance with TAPPI T425 test method.

"MD" and "TD" refer to the machine direction and the transverse direction in the manufacturing process, respectively.

"Measured Thickness" is determined by cross-section microtoming a thin slice of the film and viewing the cross-section under a scanning electron microscope with a calibrated image scale to determine individual layer thicknesses of the multilayer film.

"TD shrink tension" of the film or label formed therefrom is determined in accordance with ASTM D2838 test method.

"MD and TD shrink" is determined in hot oil as a function of temperature in accordance with ASTM D1204 test method.

"Natural shrink" of the film is the unconstrained % shrink of a film sample after exposure to a prescribed temperature after a defined period of time.

"Z Axis Strength" is the measure of the inter-laminar strength of a film specimen and covers measurement of the forces exerted when a specimen is pulled apart in the Z direction (i.e., through the cross-section). Scotch 610 tape (1 inch width and 8 inches long) is applied to both sides of the film specimen with moderate pressure to ensure that the tape has adhered to the sample on both sides. The two tapes are initially pulled apart manually to initiate inter-laminar failure. Once the z-axis failure has been initiated, the two tape tabs of the sample are placed in a MTS Q-Test/1 L tensile tester or similar instrument (25N cell) and separated at a cross head speed of 35 inches/minute. The peak and peel force is recorded and reported as grams per inch of width. If the sample does not initiate or fail by interlaminar separation, it is reported as "could not delaminate"

"Yield" is the coverage in square inches/pound (in.$^2$/lb.) and is determined in accordance with ASTM D4321 test method.

"Uniaxial" in specifying the direction of orientation of films of this invention refers to films in which the draw ratio in one direction (MD or TD) is less than 1.4× and the draw ratio in the opposed, or orthogonal direction is greater than 2.0×. In such a film the uniaxial direction of orientation is the direction in which the film is stretched more than 2.0×.

The terms "biaxial" and "bidirectional" are synonymous terms for specifying the direction of orientation of films in which the draw ratio in both the MD and TD directions is greater than 2.0×.

All percentages and ratios are calculated by weight unless otherwise indicated and are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Advantages of the Invention

A surprisingly effective voiding efficiency of silica gel as an opacifying agent for stretched polyolefin film has been identified. The high efficiency relative to other voiding agents makes it possible to 1) reduce density at similar film strength, 2) produce film with high strength and very low density, 3) produce opaque films with very low additive levels. A further advantage of the invention is the surprising fact that cavitation occurs with a uniaxially stretched film. With other voiding agents, there is little or no cavitation and consequently an increase in density associated with the addition of a mineral voiding agent.

In addition, this invention takes advantage of the unexpected ink hiding property of silica gel in at least the core of a uniaxial shrink film, which enables low density for floatability, and whiteness even when black ink is applied to the back side surface of the film. The ability to maintain whiteness is particularly surprising since the opacity and whiteness before the application of black ink is similar to other whitening and opacifying agents.

Films of the Invention

A first aspect of the invention is a film comprising at least one polyolefin and a silica gel effective to produce voiding in the film so as to make the film opaque. The film possesses one or more of the following desirable attributes of a unidirectional shrink film: floatability (i.e., a density less than 1 g/cc, and ideally less than 0.95 g/cc to allow for printing ink), high degree of shrink, high z-axis strength, high whiteness and substantial stiffness. The lower the density, the more ink application concepts are possible while still yielding a film that is floatable in water. High shrink is desirable to conform to a wide range of container geometries. High z-axis strength is important to assure that a seamed label will not split and fall off the container. High whiteness is important to provide a good print receiving surface. Stiffness is important to enable the formation of a tube that can be placed over and around the package before the shrink process is conducted.

The film is preferably a multilayer shrink film structure (or laminate) of two or more layers, such as, e.g., a laminate of 2, 3, 4, 5, 6, 7, 8, 9 or 10 layers. Particularly preferred embodiments include a core (or base) layer having a skin layer on at least one face of the core layer. Layers between the skin and core layers are also within the scope of the invention. Specific examples of suitable arrangements of layers in a multilayer film of the invention include but are not limited to the following five embodiments:

| 1 | 2 | 3 | 4 | 5 |
|---|---|---|---|---|
| Skin | Skin | Skin | Skin | Skin |
| Base | Intermediate | Core | Intermediate | Intermediate |
|  | Base | Skin | Core | Core |
|  |  |  | Skin | Intermediate |
|  |  |  |  | Skin |

The inventive multilayer films are uniaxially oriented. The construction and polymer choices are preferably consistent with the teachings of U.S. Pat. Nos. 11,590,744 B2, 11,738,544 B2 and US20220402246 A1.

The core layer is preferably the thickest layer of the multilayer film. The core layer preferably has a thickness of 10-100 microns, more preferably 20-80 microns or most preferably 30-50 microns. The core layer preferably comprises a silica gel and at least one polymer (e.g., a polyolefin). The core layer can optionally comprise at least one additive.

The term "silica" refers to the compound silicone dioxide and is sometimes referred to as silicone oxide. The silica used as a voiding agent according to the invention is silica gel. The silica family is quite large with family members having very different physical characteristics that make silicas other than silica gel unsuitable for use as voiding agents.

The two broadest categories are amorphous and crystalline silica. Crystalline silica includes quartz, cristobalite and tridymite. Amorphous silicas include natural, incidental and synthetic. Natural amorphous silicas include diatomite and calcined silica. The incidental silicas include fused and fumed silica. These silicas generally have a density of approximately 2 g/cc, which is too high for floatability. The fumed silica has a particle size that is unacceptable for film manufacture.

Synthetic silicas are generally classified as either thermal or wet. Thermal or pyrogenic silicas include glasses (high sodium, leaded, colored, tempered). Glasses commonly have a density of greater than 2 times that of polypropylene. These thermal silicas also include silicates that are commonly alloyed with other atoms to produce zeolites. These structures have very small pore sizes. The small pores adsorb and condense water through a process called capillary condensation. This entrapped water is detrimental to the polymer extrusion and stretching process associated with making film. The entrapped water escapes as the molten polymer emerges from a high pressure die, causing holes in the casting and preventing the formation of film.

Wet silicas include precipitated silica, colloidal silica, aerogel, and silica gel. Precipitated silica is commonly used as an anti-block additive in film production. It is dense and is ineffective as a voiding agent. In fact, it is commonly used in the production of clear films as an anti-blocking agent because it does not void and cause haze or whitening. Colloidal silica particle size is far too small to be useful in a polymer extrusion process. Additionally, the particle size is too small to expect voiding and cavitation. Aerogel offers low density and large pore size, however, the process includes precipitation from a super critical fluid condition, makes the cost of the raw material far too high to consider in a packaging film.

Of all the silicas, silica gel is the most desirable classification for use as a voiding agent, owing to its particle size and internal porosity creating a low density mineral agent. Not only is a low density mineral agent preferable, silica gel has the unusual and surprising characteristic of inducing cavitation in uniaxially oriented films. However, certain silica gels are unsuitable or less preferred for use as voiding agents. If the pore size of the silica gel is too small, water is adsorbed and condensed within the pores through capillary condensation. These desiccant grade silicas are referred to as A, B or C type which is defined by how the silica absorbs and internally condenses water as a function of humidity in the ambient air. Desiccant grade silica gel is very common. If the silica adsorbs through capillary condensation more than 10% of its mass at a relative humidity level of 80%, then the entrapped water will have a negative effect on the extrusion of polymer and formation of oriented film. The water will create large holes in the polymer casting as it exits the hot die when the pressure is suddenly relieved from high pressure piping and die as the casting is formed at only atmospheric pressure. The holes prevent uniform stretching and prevent the fabrication of film.

The silica gel preferred for use in this invention has an average particle size of 1 to 10 microns, and more preferably 3 to 7 microns. The silica gel preferably adsorbs less than 8% moisture at 80% relative humidity. More preferably, the moisture adsorption is less than 5% at 80 relative humidity. This feature is commonly associated with silica gels with an average pore size of greater than 6 nm, which is therefore the preferred average pore size of silica gels of the invention. More preferably, the average pore size is greater than 10 nm, and still more preferably greater than 15 nm. Average pore size beyond 25 nm is unusual and generally very expensive. Thus, the average pore size is preferably 6-25 nm or 10-25 nm or 15-25 nm. All silica gel is porous and therefore the particles are inherently less than 0.8 g/cc in density, which is a helpful feature in achieving a floatable composition. Surprisingly, the silica gel also causes cavitation when included in a polyolefin film core, further reducing the density of the composite films.

Silica gel loading in the core can be from 1 to 30 wt. %, preferably from 1 to 10 wt. % and more preferably from 3 to 7 wt. % based on the weight of the core. The higher levels of silica gel enable the addition of higher density opacifying agents like titanium dioxide in the core or skin layers.

Silica gel can be used as the sole voiding agent in the film or can be used in a combination of voiding agents including at least one additional voiding agent in addition to the silica gel. It is preferred to exclude carbon black from the film due to its negative impact on whiteness. Preferably, the average density of the combination of voiding agents in the multilayer film is less than 1 g/cc. The average density of the combination of silica gel (SG) and additional voiding agent(s) (AVA) can be determined by multiplying the density of each voiding agent by the volume of each voiding agent in the combination, summing the results and then dividing the sum by the sum of all the volumes.

Silica gel can also be used in conjunction with other opacifying agents or colorants like $TiO_2$ in one or more layers of a film.

Polymers

Polymers make up the majority of the core layer, and preferably constitute 60-95 wt. % of the core, or 70-91 wt. % of the core.

Polymers suitable for use in the core layer include but are not limited to propylene terpolymer (with ethylene and butene), butene-1 copolymers with ethylene, propylene elastomeric copolymers (with ethylene), styrenic triblock (S-E/B-S) copolymer elastomers and polypropylene-butene random copolymer. Trade names for these elastomers include: VISTAMAXX (EXXONMOBIL), KRATON (KRATON CORPORATION), TAFMER (MITSUI CHEMICALS), VERSIFY (DOW CHEMICAL). Polymers suitable for use in the core are also disclosed in U.S. Pat. No. 11,590,744 B2 and US20220402246 A1.

Styrene Polymers

Styrene-Butadiene-Styrene block copolymers are commercially available from Ineos Styrolution America, LLC, Aurora, IL or its distributor, PolyOne Corporation, Littleton, MA. General purpose polystyrene homopolymers are commercially available from American Styrenics, The Woodlands, TX or its distributor PolyOne Corporation, Littleton, MA. The following is a non-exclusive listing of exemplary styrene polymers that are, or that may be usable in the skin layers of the films of this invention:

STYROLUX S, Styrene-Butadiene-Styrene block copolymer (S/B/S) with a specific gravity of 1.02 g/cm$^3$, an MFR (200/5)=10 dg/min and a Vicat softening temperature of 72° C.

STYROLUX T, styrene-butadiene block copolymer (SBC) with a specific gravity of 1.02 g/cm$^3$, an MFR (200/5)=10 dg/min and a Vicat softening temperature of 67° C.

K-resin KR-52, a styrene-butadiene block copolymer (SBC) with a specific gravity of 1.01 g/cm$^3$, an MFR (200/5)=9 dg/min and a Vicat softening temperature of 61° C. It is also available from Ineos Styrolution America, and can be used in place of STYROLUX T, in combination with STYROLUX S and STYROLUX T, or can be used alone.

EA3400, is a general purpose polystyrene homopolymer with a specific gravity of 1.04 g/cm$^3$, an MFR (200/5)=9 dg/min and a Vicat softening temperature of 99° C. This homopolymer is usable in combination with STYROLUX T or K-resin KR-52 in the skin layer to provide a balance of stiffness and shrink performance. Preferably EA3400 is present in the range of from about 1% to about 70% by weight of the combination in the skin.

COC Blends

TOPAS 8007F-04 is a cyclic-olefin copolymer (COC). TOPAS 8007F-600 and 9506F-500 are cyclic-olefin copolymers (COC) incorporating a minor component of linear low density PE to reduce fracture of the brittle pellets during extrusion. ZEONEX COP cyclic olefin polymer from Zeon Chemical (Japan) is also useful. The identified cyclic-olefin copolymers are copolymers of ethylene and norbornene polymerized with a metallocene catalyst. Since they are predominantly PE and metallocene catalyzed, they have nearly identical rheological behavior to mLLDPE. COC provides stiffness and promotes solvent seaming, as well as contributing to the shrink performance of the film. The 8007F grades from TOPAS have a density of 1.02 g/cc, a Tg of 78° C., and a melt index of 11 dg/min (230° C., 216 kg). The 9506F grades from TOPAS have a density of 1.02 g/cc, a Tg of 65° C. and a melt index of 5.4 dg/min (230° C., 216 kg). Other COC's may be useable in this invention, e.g., APEL8008T from Mitsui Chemical. Individuals skilled in the art can easily determine, without an undue amount of experimentation, COC's usable in this invention.

Styrene Block Copolymers (S-E/B-S and S-E/P)

Elastomeric Styrene block copolymers (SBC) with triblock styrene-ethylene-co-butene-styrene or styrene-ethylene-co-propylene-styrene or diblock styrene-ethylene-co-butene or styrene-ethylene-co-propylene structures which are suitable for use in the core layer of the films of this invention are commercially available from KRATON Corporation, Houston, TX or its distributor Univar Solutions, Downers Grove, Illinois. Other Styrene block copolymers considered to be usable in this invention, and identified hereinafter, are commercially available from Kuraray Elastomer Division of Kuraray Americas, Inc., Houston, TX and Asahi Kasei, Tokyo, Japan, or its distributor Marubeni Specialty Chemicals Inc., White Plains, NY. In certain embodiments, the elastomeric styrene block copolymers are present in the core together with the polypropylene terpolymer or copolymer, optionally the propylene-based elastomer, and optionally the polybutene-1 copolymer. The core can include one or more elastomeric styrene block copolymers in which the "rubbery block" composition is ethylene-butene or ethylene-propylene. These elastomeric materials have a specific gravity in the range of 0.89 to 0.93 g·cm$^3$, a styrene content of 12 to 40%, and an ethylene-butene or ethylene-propylene copolymer content of 60-88%, by weight. The styrene block copolymer component of the core is a preferred component, contributing to the shrink performance of the film, the excellent adhesion of the skin layers to the core, and the excellent optical properties of the transparent versions of the film.

Suitable KRATON elastomeric styrene block copolymers include:

KRATON G1645: Styrene-ethylene-co-butene-Styrene triblock elastomer with 12.5% styrene content, MFR (230/2.16)=3.3 dg/min, and ethylene-co-butene block Tg=-42.

KRATON G1652: Styrene-ethylene-co-butene-Styrene triblock elastomer with 30% styrene content, MFR (230/2.16)=5 dg/min, and a specific gravity of 0.91 g/cm$^3$.

KRATON G1643: Styrene-ethylene-co-butene-Styrene triblock elastomer with 20% styrene content, MFR (230/2.16)=19 dg/min, and a specific gravity of 0.90.

KRATON G1657: Styrene-ethylene-co-butene-Styrene triblock (70%)/Styrene-ethylene-co-butene diblock (30%) with 13% styrene content, MFR (230/5)=22, and a specific gravity of 0.90 g/cm$^3$.

KRATON G1726: Styrene-ethylene-co-butene-Styrene triblock (30%)/Styrene-ethylene-co-butene diblock (70%) with 30% styrene content, MFR (190/2.16)=19, and a specific gravity of 0.91 g/cm$^3$.

KRATON G1730: Styrene-ethylene-co-propylene-styrene-ethylene-co-propylene tetrablock elastomer with 21% styrene content, MFR (230/5)=13 dg/min, and a specific gravity of 0.90 g/cm$^3$.

KRATON G1701: Styrene-ethylene-co-propylene diblock elastomer with 37% styrene content, MFR (230/5)=1 dg/min, and a specific gravity of 0.92 g/cm$^3$.

KRATON G1702: Styrene-ethylene-co-propylene diblock elastomer with 28% styrene content, MFR (230/5)<1 dg/min, and a specific gravity of 0.91 g/cm$^3$.

Elastomeric Styrene block copolymers (SBC) are also available from Kuraray Elastomer Division of Kuraray Americas, Inc., Houston, TX under the tradename SEPTON. Suitable SEPTON elastomer grades include:

SEPTON 2063: Styrene-ethylene-co-propylene-Styrene triblock elastomer with 13% styrene content, MFR (230/2.16)=7 dg/min.

SEPTON 2004F: Styrene-ethylene-co-propylene-Styrene triblock elastomer with 18% styrene content, MFR (230/2.16)=5 dg/min SEPTON 2002: Styrene-ethylene-co-propylene-Styrene triblock elastomer with 30% styrene content, MFR (230/2.16)=70 dg/min.

Elastomeric Styrene block copolymers (SBC) are also available from Asahi Kasei, Tokyo, Japan or its distributor Marubeni Specialty Chemicals Inc., White Plains, NY. under the tradename TUFTEC.

TUFTEC P1500 SEBS with a specific gravity=0.91 g/cm$^3$, a PS content=30%, and a MFR (190/2.16)=4.0.

Polypropylene Terpolymers and Copolymers

Polypropylene terpolymers are commercially available from LyondellBasell, Houston, TX under the trade name ADSYL. The following is a non-exclusive listing of exemplary polypropylene terpolymers that are, or that may be usable in the core layers of the films in this invention:

LyondellBasell ADSYL 6C30F is a Ziegler-Natta catalyzed random terpolymer of propylene, ethylene, and butene with the propylene being the predominant component, by weight, of the terpolymer. ADSYL 6C30F has a MFR (230/2.16) of 5.5 dg/min, a SIT of 98° C., and a DSC peak melting point of 126° C.

ADSYL 7410XCP also is a terpolymer of propylene, ethylene and butene, with propylene being the predominant component, by weight, and which has a MFR (230/2.16) of 5.5 dg/min, a SIT of 75° C., and a DSC peak melting point of 125° C. and ADSYL 5C30F with a melt flow rate of 5.5 dg/min (230° C., 2.16 kg), a SIT of 105° C., and a DSC peak melting point of 132° C.

Polypropylene copolymers with ethylene or butene-1 as co-monomers are commercially available from a number of sources, including LyondellBasell in Houston, TX, Ineos Olefins & Polymers USA headquartered in League City, TX, Braskem America Inc. headquartered in Philadelphia, PA and Total USA headquartered in Houston, TX. The following is a non-exclusive listing of exemplary polypropylene copolymers that are, or that may be usable in the core layers in the films of this invention:

INEOS ELTEX P KS407 is a copolymer of propylene and about 4.0% ethylene, with propylene being the predominant component, by weight, and which has a MFR (230/2.16) of 5 dg/min, and a DSC peak melting point of 134° C.

BRASKEM DS6D82 is a copolymer of propylene and about 4.0% ethylene, with propylene being the predominant component, by weight, and which has a MFR (230/2.16) of 7 dg/min, and a DSC peak melting point of 134° C.

TOTAL 8573 is a copolymer of propylene and ethylene with propylene being the predominant component, by weight; having a MFR (230/2.16) of 6.8 dg/min and having a DSC peak melting point of approximately 135° C.

LyondellBasell ADSYL 7416 XCP is a copolymer of propylene and ethylene with propylene being the predominant component, by weight; having a MFR (230/2.16) of 7.5 dg/min and having a DSC peak melting point of approximately 133° C.

LyondellBasell ADSYL 7415 XCP is a copolymer of propylene and ethylene with propylene being the predominant component, by weight, having a MFR (230/2.16) of 0.9 dg/min and having a DSC peak melting point of approximately 133° C.

LyondellBasell ADSYL 3C30F HP is a copolymer of propylene and butene-1 with the propylene being the predominant component, by weight, of the copolymer and which has a MFR (230/2.16) of 5.5 dg/min, and a DSC peak melting point of 137° C.

Polypropylene terpolymers and copolymers are primary components of the core and provide high clarity and are a contributing factor to high shrink performance within the temperature range requirement of heat shrink label applications (90-100° C.).

Polybutene-1 Copolymer

Polybutene-1 copolymers are commercially available from LyondellBasell, Houston, TX under the trade names KOATTRO and TOPPYL. LyondellBasell KOATTRO DP8310M and TOPPYL DP8220M are Polybutene-1 copolymers with ethylene.

KOATTRO DP8310M has a MFR (190/2.16) of 3.5 dg/min, a melting point of 94° C., and a density of 0.897 g/cm$^3$, and is characterized as having a high ethylene content. In this copolymer the ethylene content is less than 50% by weight thereof, and most preferably is less than 15% by weight.

TOPPYL DP8220M has a MFR (190/2.16) of 2.5 dg/min, a melting point of 97° C., and a density of 0.901 g/cc and is characterized as having a medium ethylene content. In this copolymer the ethylene content is less than 50% by weight, and most preferably is less than 15% by weight. This does have a lower ethylene content than KOATTRO DP8310M, identified above.

Polybutene-1 copolymer is an optional component of the core, which contributes to the desired, high shrink performance within the temperature range requirement for heat shrink label applications (80-100° C.).

VISTAMAXX and VERSIFY Copolymers

Propylene-based polyolefin elastomers (POE's) are commercially available from ExxonMobil Chemical Company under the trade name VISTAMAXX or Dow Chemical Company under the trade name VERSIFY.

Composition and structure: These POE's are semi-crystalline copolymers of propylene and ethylene with high propylene levels (>80 wt. %) with isotactic stereochemistry. Crystallinity is modulated by the ethylene content to 5-45% crystallinity complementary to a large amorphous fraction. These POE's also have the following properties: a narrow Molecular Weight Distribution (MWD), a MFR (230/2.16) in the range of 2 to 25 g/10 min, a density in the range of 0.863 to 0.891 g/cm$^3$, a Glass Transition Temperature Tg in the range of 5 to −31° F. (−15 to −35° C.) and a Melting Range: of 122 to 248° F. (50 to 120° C.) and higher.

VISTAMAXX 3980FL: MFR (190/2.16) of 3.2 dg/min, ethylene content of 9%, density of 0.879 g/cm$^3$, and Vicat softening point of 76.7° C.

VERSIFY 3000: MFR (230/2.16) of 8 dg/min, density of 0.88 g/cm$^3$, melting point of 108° C., crystallinity=44%, and Vicat softening point of 52° C.

The propylene based POE, like the polybutene-1 copolymer, is an optional component of the core layer, which contribute to the desired, high shrink performance within the temperature range requirement for heat shrink label applications (80-100° C.).

The structure is preferably a three-layer structure with skins of styrene, or cyclic olefin, copolymer, and styrene ethylene/butene copolymers. Five layer structures can be used, especially where it is desired to use tie layers to achieve strong adhesion between the core and the skin. Glycol-modified polyethylene terephthalate (PETG) skins as taught in U.S. Pat. No. 11,738,544 B2 can be used with tie layers. The at least one skin layer comprises at least one amorphous copolyester having a Tg no greater than 85° C., more preferably in the range of 60° C.-85° C. and most preferably in the range of 60° C.-80° C. Preferably, the at least one amorphous copolyester is a modified, amorphous polyethylene terephthalate; most preferably PETG. The at least one interlayer (tie layer) between the PETG skin and polyolefin core contains polypropylene terpolymer and an ethylene copolymer with a co-monomer of vinyl acetate, methyl acrylate or possibly ethyl acrylate. Optionally, the ethylene copolymer with vinyl acetate, methyl acrylate or possibly ethyl acrylate can contain reactive functional groups. These films are useful for the manufacture of labels, in particular solvent seamed sleeve labels, which shrink, when heated at temperatures compatible with the use of a steam tunnel, to conform to the shape of the container. The density of the film is preferably below 1.0 g/cm$^3$ and more preferably below 0.98 g/cm$^3$.

Other Additives

Other additives like slip agents, antiblock agents, UV adsorbers, colorants, anti-oxidants, and antacids can be used in the core layer and/or other layers of the film. When present in the core layer, additives preferably constitute 0.1-20 wt. %, 1-15 wt. % or 5-10 wt. % of the core layer.

White non-voiding opacifying pigments (TiO$_2$ concentrates) are commercially available from LyondellBasell, Houston, TX under the trade names POLYBATCH. Preferred are concentrates in a polyethylene carrier polymer. The following is a non-exclusive listing of exemplary TiO$_2$ concentrates that are, or that may be usable in the core layers of the films in this invention:

POLYBATCH White LL8006 CT, 70 wt. % TiO$_2$ in a 20 MI LLDPE carrier. MFR of the concentrate (190° C., 2.16 kg is 6-11 g/10 min., and the concentrate is calcium stearate free.

POLYBATCH White 8000 EC, 70 wt. % TiO$_2$ in a 13 MI LDPE carrier. MFR of the concentrate (190° C., 2.16 kg is 2-6 g/10 min., and the concentrate is calcium stearate free.

The skin is preferably 0.1 to 10 microns, and most preferably 0.5 to 5 microns in thickness. The skin can contain whitening agents like TiO$_2$. It can also be voided with silica gel. Other additives include colors, slip agents, and UV stabilizers for outside use.

The intermediate (or tie) layer, when present, is preferably 0.1 to 10 microns, and most preferably 0.5 to 5 microns in thickness.

In a preferred embodiment of this invention the oriented, multilayer shrink film has shrinkage in one direction of formation, most preferably the transverse direction of formation, of at least 40%, and more preferably at least 50%, and most preferably at least 60%, when heated in the temperature range of 90-100° C. Most preferably at least 60% shrinkage in at least one direction, preferably the transverse direction of formation, is achieved in the temperature range of 93-97° C.

In the most preferred embodiments, when the films are employed in the formation of labels for attachment to containers and bottles, it is desirable to form the films with a density less than 1 g/cm$^3$; most preferably significantly below 1 g/cm$^3$, e/g., less than 0.96 g/cm$^3$ and more preferably less than 0.94 g/cm$^3$. Particularly for shrink sleeve applications requiring full-body graphics, the print layers can add as much as 0.03 g/cm$^3$ density to the base film so densities below 0.96 g/cm$^3$ for the base film is highly desirable and permits the labels to be easily separated from the heavier containers, which have a density greater than 1 g/cm$^3$, during the recycling process.

In accordance with this invention the overall thickness of oriented films employed to form bottle labels can range from 10 microns to 90 microns, more preferably from 12 microns to 75 microns; even more preferably from 30 microns to 65 microns. In the most preferred embodiments of this invention, the film is a multilayer film including a core layer between opposed skin layers.

The film surface can be treated with Corona, flame, plasma to improve printability or adhesion.

The film surface can be subsequently coated with common primers or coatings to achieve various functionalities.

Labels

Another aspect of the invention is a label comprising the inventive film.

The inventive films are useful for the manufacture of labels, in particular solvent seamed sleeve labels, with shrink to conform to the shape of the container when heated at temperatures compatible with those encountered in a steam tunnel.

Most preferably, a container label of this invention is in the form of a sleeve having a circumferential dimension configured to surround a periphery of a container and a transverse direction substantially normal to said circumferential direction, said circumferential dimension being the dimension with the greatest shrinkage when said label is heated to a desired temperature no greater than 100° C. to effect shrinkage. In certain embodiments, the at least one amorphous styrene-butadiene block copolymer or at least one amorphous ethylene-norbornene copolymer (COC) in the skin layer(s) permits effective solvent seaming, which is highly desirable in sleeve labels. In the preferred embodiment, the label is formed from a film in which the transverse direction of film formation is the direction of greatest shrinkage, and this transverse direction of formation constitutes the circumferential direction of the label surrounding the container.

Most preferably, the circumferential dimension of the container label is the transverse dimension of formation of the oriented, multilayer film from which the label is formed.

Most preferably, the films and/or labels made from these films have high stiffness, low natural shrink together with directional shrink at 95° C., and density less than 1.0 g/cm$^3$ to facilitate easy separation from PET containers during recycling after use, and a broad orientation processing window.

The inventive films are useful for the manufacture of labels, in particular solvent seamed sleeve labels, which shrink, when heated at temperatures compatible with the use of a steam tunnel for heat transfer, to conform to the shape of the container. The preferred multilayer films of this invention have a density of less than 1 g/cm$^3$.

Flexible Package

Another aspect of the invention is a flexible package comprising the inventive film. The flexible package comprises at least one chamber for holding the contents of the package, such as food, pharmaceuticals, cosmetics, etc. The walls of the chamber comprise the inventive film. In preferred embodiments, the flexible package further comprises ink applied to a print receiving surface of the film.

Method of the Invention

Silica gel can be added directly to the polymer before extrusion or as a masterbatch, where the silica gel is incorporated separately into a polymer carrier before extrusion through the film forming die. The use of a masterbatch is for convenience and typically has a concentration that is higher than the final desired concentration in the film.

The inventive multilayer films are composed of two or more layers of different polymers, each contributing distinct properties to the final product. Uniaxial orientation involves stretching a multilayer film in one direction, either transverse or longitudinal, resulting in enhanced mechanical strength.

The design of the multilayer film involves determining the number and arrangement of layers, as well as their thickness ratios. The combination of different materials can yield synergistic effects, enhancing the overall performance of the film. The arrangement can be symmetric (e.g., A/B/A) or asymmetric (e.g., A/B/C). Each layer serves a specific purpose, such as enhancing barrier properties or improving mechanical strength.

The selected polymer or polymer blend is subjected to an extrusion process, where it is melted and formed into a continuous sheet of film. This initial film sheet serves as the foundation for the stretch film and is created by feeding polymer pellets into an extruder, which heats the material and forces it through a narrow slit, forming a continuous sheet.

During this stage, silica gel and other additives can be introduced into the polymer mixture to enhance specific characteristics of the film.

As the freshly extruded film emerges from the extruder, it must be rapidly cooled and solidified to maintain its integrity. This is achieved by passing the film through a series of chilled rollers or water baths. Rapid cooling ensures that the polymer molecules arrange themselves in an orderly fashion.

The cooled film is then stretched in a single direction to impart the film with enhanced strength and elasticity. Preferably, the film is passed through a set of rollers, with one roller rotating at a slightly faster speed than the other. This speed differential causes the film to stretch in the machine direction, while the transverse direction remains relatively unaffected. The degree of stretching is carefully controlled to achieve the desired properties.

During stretching, the polymer chains align along the direction of stretch, creating a more crystalline structure. This alignment enhances the film's tensile strength and tear resistance, making it capable of withstanding significant forces when applied in packaging and bundling applications. The stretching process also induces the formation of voids around the silica gel voiding agent in the film.

After the stretching process, the film is passed through additional rollers to adjust its thickness. Thickness control is helpful to ensure that the film meets the specific requirements of its intended application. Thicker films provide added strength and puncture resistance, while thinner films are more cost-effective and may offer better stretchability. The multilayer film of the invention preferably has a thickness of 10-100 microns, and most preferably 25-55 microns.

The invention will be illustrated in more detail with reference to the following Examples, but it should be understood that the present invention is not deemed to be limited thereto.

Examples

Materials and Methods

Density was determined by the displacement procedure of ASTM D 792 test method.

Opacity was measured using a Technidyne Corporation Opacitmeter Model BNL-3 (New Albany, IN) or similar device following ASTM D589.

Whiteness was measured using a X-Rite SP60 (Grand Rapids, MI) or a similar device in accordance with ASTM E313. The base plate against which the sample film was placed for measurement had a whiteness of 55+5.

Whiteness with applied black layer was measured as follows. One side of sample film was coated with a UV Black ink (92NCF09 Base Black BW8 from Nazdar Ink Technology (Shawnee, KS)) or similar ink with a 500 Analox Echcocel junior roller from Harper Inc. (Charlotte, NC) or similar roller. The ink was cured using a Fusion UV System Model I300 MB or similar system. The ink drying and sample holding method were chosen to avoid film shrinkage. Whiteness was measured on the sample film side opposite the black ink using a X-Rite SP60 (Grand Rapids, MI) or a similar device in accordance with ASTM E313. The base plate against which the sample film was placed for measurement had a Whiteness of 55+5.

TD Shrink is the unconstrained percentage shrink of a film sample at a prescribed temperature after a defined period of time. As described in the following examples, hand sheets, typically 8.5 in (21.6 cm) by 11 inches (27.9 cm) were cut from the roll in the transverse direction (TD). The sample was placed without constraints in a hot air oven set at the prescribed temperature for 24 hours. Sample dimensions in the MD and TD direction were measured before and after heat exposure and the percent shrinkage was calculated from the change in measured dimensions.

Z-axis Strength is the measure of the interlaminar strength of a film specimen and covers measurement of the forces exerted when a specimen is pulled apart in the z direction perpendicular to the surface (i.e., through the cross section). Scotch 610 tape (1 inch width and 8 inches long) was applied to both sides of the film specimen with moderate pressure. To ensure z axis failure, the tape was initially pulled apart manually to initiate inter-laminate failure. Once the z-axis failure was initiated, the two tape tabs of the sample were placed in a MTS Q-Test/1 L tensile tester or similar instrument (25N cell) and separated at a cross head speed of 35 inches/min. The peak force was recorded and reported as g/in of width. If the sample did not initiate or fail by inter-laminate separation, it was reported as "could not delaminate".

Flex Stiffness measures the stiffness or bending resistance of plastic films using a MTS/Sintech Q-Test Model QT-5 or similar instrument, a 2N (200 g) load cell, a triangular shaped stirrup attached to the load cell and a film holding fixture with a 1 inch wide channel which holds the film in the form of an arc. Film sample length was 4 inches with a width between 1 and 4 inches, and cross head speed was 12 inches/min. The maximum compressive force required to bend the film sample at the center of the arc was measured. Results are reported as grams per inch width (peak grams divided by sample width in inches).

Six symmetric three-layer film formulations were produced to demonstrate the unique ink hiding power of silica gel while achieving a floatable shrink film. The skins were held constant and the core elastomers were held constant with the amount adjusted to accommodate the voiding/opacifying agent content and associated masterbatch compositions.

The materials used in the examples are identified in Table 1 below.

TABLE 1

| Generic Description | Specific Material | Supplier |
|---|---|---|
| Cyclic Olefin ethylene-norbornene Copolymer | TOPAS 8007F-600 | Polyplastic USA Inc.; Farmington Hills, MI |
| Cyclic Olefin ethylene-norbornene Copolymer | TOPAS 9506F-500 | Polyplastic USA Inc.; Farmington Hills, MI |
| Polybutene 1 Copolymer | DP8310M | Lyondell Basell; Houston TX |
| Polyolefin Elastomer | VISTAMAX 3980FL | Exxon Mobile; Irving, TX |
| Propylene-ethylene-butene Terpolymer | ADSYL 6C30F | Lyondell Basell; Houston TX |
| Propylene-ethylene copolymer | DS6D21 | Braskem; Philadelphia, PA |
| 60% TiO2 Polypropylene Masterbatch | POLYBATCH LL8006CT | Lyondell Basell; Houston TX |
| 62.5% CaCO3 + 7.5% TiO2 Polypropylene Masterbatch | WP56288 | Washington Penn; Washington PA |
| Silica gel | SYLOID C 603 | Grace Davison; Baltimore, MD |

Six examples of three-layer biaxially oriented films with an A/B/A structure were produced. See Table 2 below.

TABLE 2

| | Example (A/B/A Structure) | | | | | |
|---|---|---|---|---|---|---|
| | 1 (wt. %) | 2 (wt. %) | 3 (wt. %) | 4 (wt. %) | 5 (wt. %) | 6 (wt. %) |
| Skins (A) (5-6 microns each) | | | | | | |
| TOPAS 8007F-600 | 40 | 40 | 40 | 40 | 40 | 40 |
| TOPAS 9506F-500 | 60 | 60 | 60 | 60 | 60 | 60 |
| Core (B) (36-38 microns each) | | | | | | |
| ADSYL 6C30F | 40 | 28 | 24 | 30 | 40 | 40 |
| DP8310M | 26.7 | 18.7 | 16 | 20 | 25 | 25 |
| VISTAMAXX 3980FL | 33.3 | 23.3 | 20 | 25 | 28.6 | 25 |
| POLYBATCH LL8006CT | | | 10 | | 6.4 | 10 |
| DS6D21 | | 24 | 24 | | | |
| WP 56288 | | | | 25 | | |
| SYLOID C 603 | | 6 | 6 | | | |

The polymers were all processed into films using similar process conditions on a BOPP tenter line. The three layers were coextruded in a die. The melt was cast on a chill roll with a temperature of 60° C. The TD draw ratio was 7.4× with a draw temperatures of 108° C. A slight tension stress of 1.4× was also applied in the machine direction. The preheat temperature before stretch was 103° C.

The properties of the films produced are summarized in Table 3 below.

TABLE 3

| | | | Voiding Agent | | | | | |
|---|---|---|---|---|---|---|---|---|
| Film Property | Unit of Measure | Property Target | None Example 1 | 6% Silica gel Example 2 | 6% Silica gel + 6% TiO2 Example 3 | 15% CaCO3 + 1.9% TiO2 Example 4 | 4.2% TiO2 Example 5 | 6% TiO2 Example 6 |
| Density | g/cm³ | <0.95 | 0.914 | 0.884 | 0.925 | 1.019 | 0.940 | 0.970 |
| Opacity | % | >50 | Not appropriate | 54 | 81 | 53 | 69 | 74 |
| Whiteness before black layer | | | Not appropriate | 73 | 84 | 72 | 80 | 81 |
| Whiteness(with black layer) | | >60 | Not appropriate | 72 | 80 | <20 | <20 | <20 |
| TD Shrink - 95° C. | % | >40 | 64 | 57 | 58 | 58 | 66 | 65 |
| TD Shrink - 100° C. | % | >50 | 69 | 62 | 67 | 62 | 70 | 70 |
| Z-axis Strength | g/in | >100 | 294 | 461 | 563 | 249 | 119 | 177 |
| Flex Stiffness (MD) | g/in | >3 | 3.4 | 5.8 | 5.2 | 3.6 | 3.3 | 4.5 |
| (TD) | | | 4.2 | 6.0 | 6.2 | 4.3 | 4.2 | 5.8 |

Example 1 was a comparative example showing performance suitable for a floatable shrink film. The film was transparent, making measurements of opacity and whiteness inappropriate.

Example 2 showed the benefit of silica gel to enable the production of a film with a density of far less than 0.95 g/cc required for floatability. It also showed that the whiteness after the application of black ink to the back side is relatively unchanged.

It is surprising that silica gel cannot only act as a voiding agent in a film with elastomeric components, but that it also has unusual ability to hide the impact of black ink even though its measured opacity and whiteness before the application of black ink is similar to other opacifying and voiding agents like $TiO_2$ and $CaCO_3$. This is important because black ink is the best means to stop UV rays and protect food like dairy products. However, the packaging industry needs to have a white label to print. Example 2 shows that including silica gel as a voiding agent enables the production of labels that are floatable, opaque and have a white print receiving surface despite having a black layer on the opposing surface of the label.

Example 3 shows that because the silica gel so dramatically lowers the density, the inclusion of a dense whitening/opacifying agent like $TiO_2$ can be tolerated and still meet the density target while offering even higher whiteness and opacity.

Example 4 was a comparative example showing the limit of $CaCO_3$ and $TiO_2$ addition to the film. Even though the maximum floatable density value was exceeded, the film still failed to meet the whiteness target after the application of black ink.

Examples 5 and 6 were comparative examples showing the impact above and at the upper limit of density, where neither condition meets the whiteness target after the application of black ink.

Table 3 also shows the surprising feature that opacity is not directly related to the ability to hide the impact on the front side whiteness of the black ink applied to the back side.

Surprisingly, the sample with silica gel has higher z-axis strength than even the film with no voiding/opacifying agent. This suggests that silica gel may also contribute to mechanical reinforcement of the film while $TiO_2$ and $CaCO_3$ are observed to decrease the strength.

Surprisingly, the stiffness of the film with silica gel is higher than the unfilled, or the $TiO_2$ only, and $CaCO_3$ containing sample. This observation is consistent with the higher z-axis strength being related to an unexpected mechanical reinforcement mechanism. It is desirable because it can enable thinner labels and potentially higher processing speeds.

FIG. 1 shows a scanning electron microscopic image of a cross-sectioned core of the film of Example 2 at 2000× magnification. The creation of voids (cavitation) by the silica gel is clearly evident. This was unexpected. It is known that elastomeric components suppress the formation of voids with traditional cavitants like $CaCO_3$. Given that the core in this example is primarily elastomeric, it is surprising to see the degree of cavitation that the silica gel can induce. The presence of cavitation maybe the reason for the greater hiding ability of the black ink compared to $TiO_2$ alone or $TiO_2$ in combination with $CaCO_3$.

While the invention has been described in detail and with reference to specific examples thereof, it will be apparent to one skilled in the art that various changes and modifications can be made therein without departing from the spirit and scope thereof.

What is claimed is:

1. A multilayer film comprising a plurality of layers including a thickest layer comprising 1 to 25 wt. % of a silica gel having an average particle size of 1 to 10 microns, and at least 50 wt. % of at least one polyolefin, wherein: (a) the thickest layer is voided by the silica gel; (b) the multilayer film is a uniaxially oriented film having an opacity greater than 10, and a density of less than 1 g/cc; and (c) the multilayer film has a shrinkage of at least 20% in a machine direction or a transverse direction of formation when heated to a temperature of 80° C.-100° C.

2. The multilayer film of claim 1, wherein the at least one polyolefin is at least one member selected from the group consisting of polypropylene, polyethylene, polypropylene/polyethylene copolymer, polypropylene/polyethylene/polybutylene terpolymer, butene-1 copolymer with ethylene and styrenic triblock (S-E/B-S) copolymer elastomers.

3. The multilayer film of claim 1, wherein the at least one polyolefin comprises polypropylene and copolymers thereof.

4. The multilayer film of claim 1, wherein the polyolefin comprises propylene-ethylene-butene terpolymer, polybutene-1 copolymer with ethylene, polyolefin elastomer, and polypropylene ethylene copolymer.

5. The multilayer film of claim 1, wherein the thickest layer comprises 5-10 wt. % of the silica gel, 20-30 wt. % propylene-ethylene-butene terpolymer, 15-20 wt. % polybutene-1 copolymer with ethylene, 18-25 wt. % polyolefin elastomer, and 20-25 wt. % polypropylene-ethylene copolymer.

6. The multilayer film of claim 1, wherein a whiteness of a print receiving surface of the multilayer film after application of a black ink to an opposing surface of the film is at least 50% of the whiteness of the print receiving surface before the application of the black ink to the opposing surface.

7. The multilayer film of claim 6, wherein the density is less than 0.95 g/cc, the opacity is greater than 50 and the whiteness is greater than 60.

8. The multilayer film of claim 7, wherein the z-axis strength is greater than 100 g/in.

9. The multilayer film of claim 7, having a z-axis strength greater than 400 g/in, and a stiffness greater than 4 g/in.

10. The multilayer film of claim 1, wherein the silica gel adsorbs less than 8% moisture at 80% relative humidity.

11. The multilayer film of claim 1, further comprising titanium dioxide.

12. The multilayer film of claim 1, comprising a combination of voiding agents including at least one additional voiding agent in addition to the silica gel, wherein an average density of the combination of voiding agents in the multilayer film is less than 1 g/cc.

13. The multilayer film of claim 1, wherein a surface thereof is treated or coated.

14. A label comprising the multilayer film of claim 1.

15. The label of claim 14, which is a wash off label.

16. The label of claim 14, which is a roll on shrink on (ROSO) label.

17. A flexible package comprising the multilayer film of claim 1.

18. The flexible package of claim 17, further comprising black ink on a surface opposing a print receiving surface, wherein an opacity of the flexible package is greater than 50 and a whiteness of the print receiving surface is greater than 60.

19. The flexible package of claim 18, wherein a density of the flexible package is less than 0.95 g/cc.

20. The flexible package of claim 18, further comprising ink on the print receiving surface, wherein a density of the flexible package is less than 1 g/cc.

* * * * *